Aug. 9, 1966　　　　S. R. MASSOLL　　　　3,265,927
LIGHT CONTROL MEANS
Filed July 12, 1963
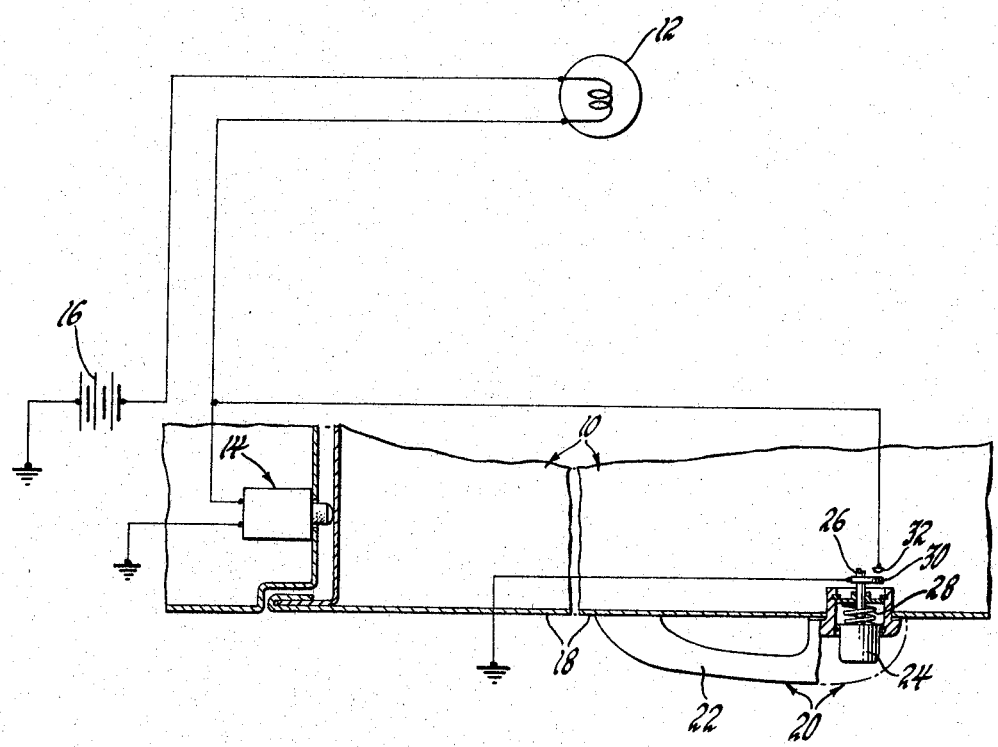
INVENTOR.
Stanley R. Massoll
BY
Herbert Furman
ATTORNEY

United States Patent Office 3,265,927
Patented August 9, 1966

3,265,927
LIGHT CONTROL MEANS
Stanley R. Massoll, Detroit, Mich., assignor to General Motors Corporation, Detroit, Mich., a corporation of Delaware
Filed July 12, 1963, Ser. No. 294,547
3 Claims. (Cl. 315—84)

This invention relates to vehicle bodies and more particularly to light control means for vehicle bodies.

In the conventional vehicle body, the dome or other interior light is connected in series with a door jamb switch across a source of power so that the light is energized upon opening movement of the door and closure of the door jamb switch. It is desirable in certain instances, such as to aid the operator in inserting the key in the lock cylinder or to enable the operator to inspect the interior of the vehicle body before entry, to energize the light means without having to first open the door.

This invention provides a vehicle body light control means which enables the operator to energize the dome light or other interior light prior to opening the vehicle door.

One feature of this invention is that it provides an improved light control means for vehicle bodies. Another feature of this invention is that it provides an improved light control means for vehicle bodies which permits an interior light to be energized by the operator prior to entering the vehicle body. A further feature of this invention is that it provides an improved light control means for a vehicle body which includes a dome or other interior light connected across a source of power by a control circuit including a door controlled switch and being energized upon opening movement of the vehicle door, with the dome or other interior light also being connected across the source of power by a second control circuit means including a normally open switch means controlled by the vehicle body latch release means so that the dome or interior light may be energized upon operation of the latch release means prior to opening movement of the vehicle door.

These and other features of the invention will be readily apparent from the following specification and drawing wherein FIGURE 1 is a view of a light control means according to this invention.

Referring now to the drawing, a vehicle body, not shown, is of conventional construction and includes the usual front doors 10 which provide passenger ingress and egress and a conventional dome or other interior light 12. A normally closed door jamb switch 14 is connected in series with the light 12 across the battery 16 or other source of power. The jamb switch 14 is normally engaged by the front jamb face of the door 10 so as to be maintained in an open position when the door is closed and to be permitted to move to a closed position when the door is open so as to energize the dome or other light 12.

Mounted on the outer panel 18 of door 10 is a conventional outside push button door handle assembly 20 which generally includes a fixed handle 22 and a push button 24 having a push rod 26 and being biased by a compression spring 28 to its inoperative position as shown. The push rod 26 is adapted to engage the outside operating member of a conventional front door lock so as to actuate this member and release the lock prior to opening movement of the door 10. The door lock is mounted on the door 10 for cooperation with a striker mounted on the usual body pillar to maintain the door 10 in closed position.

A member or disc 30 of conductive material is mounted on the push rod 26 and is located thereon so as to normally be in spaced relationship to a fixed contact 32 which is connected in series with the light 12 across the source of power. Disc 30 is normally grounded to the body through its mounting on the push rod 26. The disc 30 and contact 32 provide a normally open switch means.

When the operator depresses the push button 24, the engagement of the disc 30 with the contact 32 completes a circuit across the battery 16 so that the light 12 is energized prior to any opening movement of the door 10. The illumination from the light 12 permits the operator to find the usual key cylinder more quickly and also permits the operator to inspect the interior of the body prior to entry.

The disc 30 and contact 32 are arranged so as to be closed to each other prior to any release of the door lock. Thus, the light 12 may be energized at the will of the operator and regardless of whether the lock is released. It will also be noted that the push button 24 is independent of the usual key cylinder so that it may be operated regardless of whether the door lock is in locked or unlocked condition.

Thus, this invention provides an improved vehicle body light control means.

I claim:
1. In combination with a vehicle body including a passenger compartment, light means for illuminating said compartment, a closure for said compartment movable between open and closed positions, latch means for holding said closure in closed position and movable between locked and unlocked positions, latch operating means for releasing said latch means in unlocked position, and a source of power, means for controlling the operation of said light means comprising, first switch means controlled by said closure, first control circuit means including said first switch means and connecting said light means across said source of power, said first switch means being responsive to opening movement of said closure to enable said first circuit means to energize said light means and thereby illuminate said passenger compartment, second normally open switch means, second control circuit means connecting said light means across said source of power, said second circuit means being independent of said first switch means and including said second switch means, and means on said latch operating means for closing said second switch means upon operation of said latch operating means in either position of said latch means to enable said second circuit means to energize said light means, thereby permitting illumination of said passenger compartment when said closure is locked in said closed position.

2. The combination recited in claim 1, wherein said first switch means comprises first normally closed door jamb switch means opened by said closure upon movement thereof to closed position.

3. The combination recited in claim 1, wherein said latch operating means comprises push button means including a push rod for releasing said latch means, and said second switch means includes a movable contact mounted on said push rod and a stationary contact mounted on said body, said movable contact being closed to said stationary contact upon operation of said push button operating means to enable said second circuit means to energize said light means, thereby permitting illumination of said passenger compartment when said closure is locked in said closed position.

References Cited by the Examiner

UNITED STATES PATENTS

| | | | |
|---|---|---|---|
| 1,468,321 | 9/1923 | Newsom | 315—84 X |
| 2,339,085 | 1/1944 | Luckiesh | 315—84 X |
| 2,824,185 | 2/1958 | Sevey | 200—61.81 |
| 2,904,671 | 9/1959 | Johnston | 200—61.64 |

DAVID J. GALVIN, *Primary Examiner.*

GEORGE WESTBY, *Examiner.*

S. A. SCHNEEBERGER, *Assistant Examiner.*